Dec. 7, 1954  A. E. KITTREDGE  2,696,465
THERMOCOMPRESSION DISTILLING PLANT
Filed Jan. 22, 1951
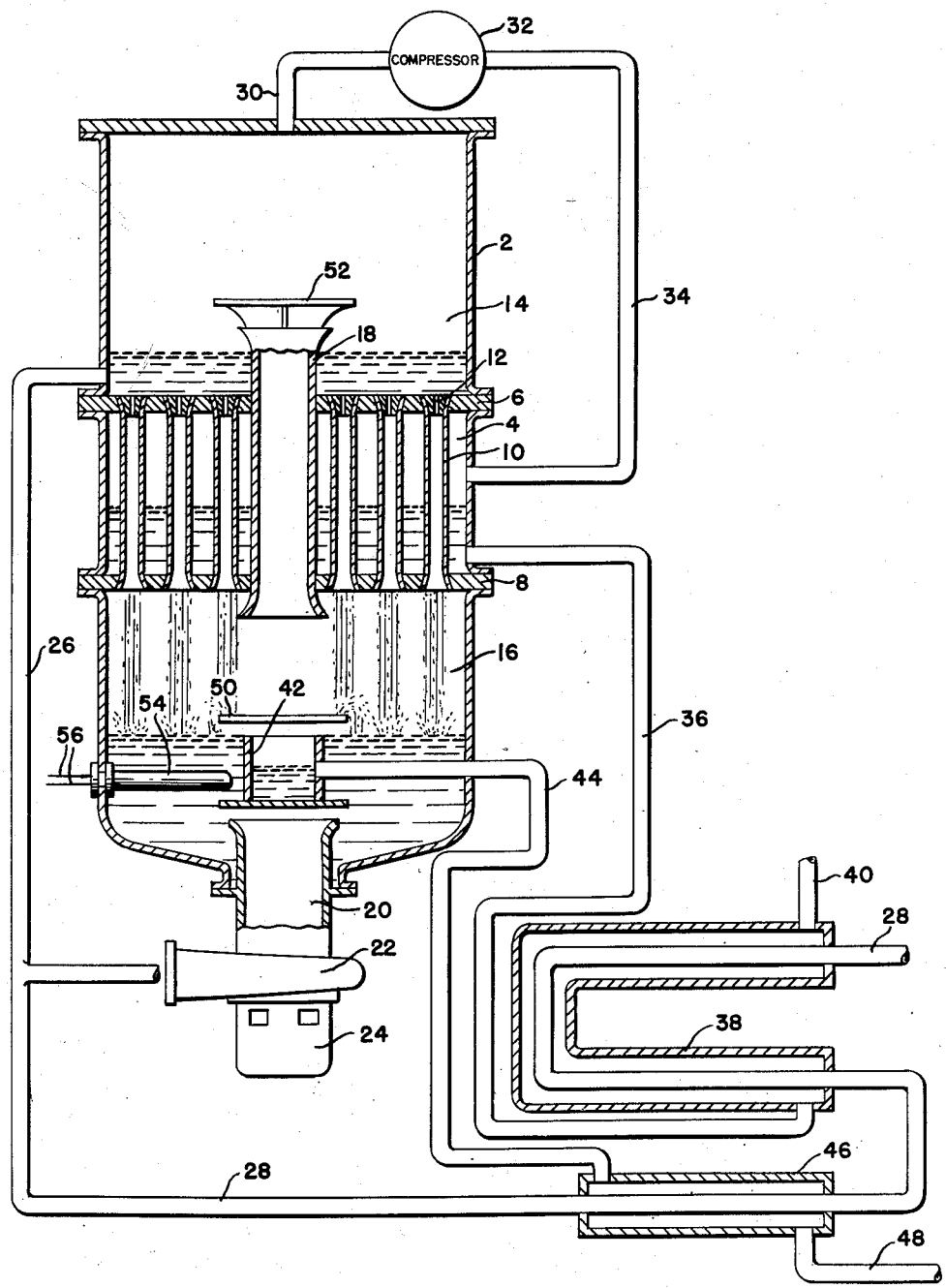
INVENTOR.
ARTHUR E. KITTREDGE
BY
ATTORNEYS.

United States Patent Office 2,696,465
Patented Dec. 7, 1954

2,696,465
THERMOCOMPRESSION DISTILLING PLANT

Arthur E. Kittredge, Audubon, N. J.

Application January 22, 1951, Serial No. 207,074

9 Claims. (Cl. 202—185)

This invention relates to evaporating plants and is particularly applicable to such plants of the vapor compression type.

For simplicity of description, the invention will be described specifically as applied to a vapor compression distilling plant for obtaining distilled water from brine, but it will be understood that it is of general application to vapor generators generally and including stills and evaporators in which interest is centered on recovery of concentrate rather than on the vapor produced or condensate therefrom.

Heretofore, evaporating plants using vertical tubes have had their tubes completely flooded, the tubes being surrounded by the vapor condensation space. Thermal circulation of the brine (using this term to include other solutions or suspensions of solids or relatively non-volatile liquids in volatile liquids) has, accordingly, resulted, the brine flowing upwardly through the heat transfer tubes, due to change of specific gravity and liberation of vapor, and overflowing from a position above the tubes in the steam space to return to a chamber at the lower ends of the tubes from which recirculation takes place.

The result of such operation, due primarily to static head and also due to frictional resistance to flow, is that the pressure within the lower ends of the tubes has been greater than at the upper ends thereof to the end that steam generation would take place only in the upper ends of the tubes. This operation fails to take full advantage of the great increase of heat transfer rate which occurs during active ebullition. In fact, the velocities of flow of the liquid upwardly through the tubes is relatively low and advantage is, therefore, not even taken of the increase of heat transfer rate resulting from increase of velocity. In brief, the pressure in the tubes is quite substantially greater than in the vapor space above the brine. In accordance with the present invention, the pressure in the brine tubes throughout their lengths is less, or at most only slightly greater, than in the vapor space. This result is achieved by providing a forced downward circulation of brine through the tubes. The result of the low pressure throughout the tubes is that ebullition takes place throughout their lengths with a resulting substantial increase of heat transfer rate. Furthermore, due to the forced circulation, high velocities of flow downwardly through the tubes takes place which, in itself, promotes heat transfer. While a brine circulating pump is required, the energy put into such pump is not wasted but is transformed into heat in the apparatus contributing to the make-up heat added by the compressor and the usual auxiliary electrical heaters.

Furthermore, in contrast with prior distilling apparatus, foaming is avoided which is a major advantage in the handling of various liquids, especially when the apparatus is used as an evaporator.

The broad object of the present invention is the attainment, in practical form, of the results above indicated. This object and other subsidiary objects particularly relating to details of construction and operation will become apparent from the following description, read in conjunction with the accompanying drawing, in which the figure is a diagram, primarily in section, showing a preferred form of apparatus embodying the invention.

As noted above, the apparatus will be specifically described as a distilling plant for brine (such as sea water) but it will be understood that the invention is of more general applicability to evaporators, steam generators, or the like. It will be understood that various valves will be provided in the apparatus in conventional fashion but these, as well as other conventional details are omitted for simplicity of disclosure.

A shell 2 is provided with a condensing chamber 4 delimited by upper and lower tube sheets 6 and 8, respectively. These sheets mount brine tubes 10 arranged vertically, and, if desired, provided at their upper ends with restricted orifices 12. These tubes 10 communicate at their upper ends with an upper vapor chamber 14 and at their lower ends with a lower vapor chamber 16. A large tube 18, which may be arranged centrally as shown, is mounted in the tube sheets 6 and 8 and has its upper end extending above the tube sheet 6 to provide an overflow for liquid which is pumped into the chamber 14 and is maintained above the tube sheet 6 to flood the upper ends of tubes 10. The lower chamber 16 communicates through a pipe 20 with the intake of a pump 22 driven by a motor 24 which pump recirculates brine from the chamber 16 through line 26 into the chamber 14. Make-up brine is provided through the conduit 28.

Steam is withdrawn from the top of chamber 14 through connection 30 and passes to the vapor compressor 32 which delivers the compressed steam through connection 34 to the condensing chamber 4. The distilled water is withdrawn from chamber 4 through conduit 36 and passes to a heat exchanger 38 where it may deliver its heat to the make-up brine entering at 28. The cooled distilled water is withdrawn at 40. An overflow chamber is provided at 42 and from this brine is withdrawn through connection 44 which communicates with a heat exchanger 46 where the brine may give up its heat to the make-up brine passing through conduit 28. The brine withdrawn through the heat exchanger 46 may be discharged at 48 to waste. As is common in these plants, it is necessary to withdraw brine continuously at a regulated rate to insure against too high a concentration of salt content.

It will be understood that the heat exchange arrangements are conventionalized in the drawing and the heat exchangers may be of any desired type.

A baffle 50 is provided above the overflow chamber 42 to prevent the direct splashing of brine emerging from the lower ends of the tubes 10 into this discharge space or chamber. A baffle 52 located above the upper open end of tube 18 provides deflection of flow to promote separation of liquid from the vapors passing upwardly through tube 18. If desired, more elaborate conventional separating means may be provided to insure that only vapor without brine enters the outlet passage 30. Electrical heaters are provided one of which is conventionally illustrated at 54 immersed in the brine in the lower portion of chamber 16, this electrical immersion heater being supplied with current through the connections 56.

The broad and general operation of the distilling plant which has been described resembles that of conventional vapor compression distilling plants heretofore known. In common with such plants brine is recirculated through tubes receiving heat from compressed steam, the latent heat of which is given up to the brine providing evaporation of water from the brine in the form of relatively low pressure steam. The action of the compressor adds heat to the steam and also provides the compressed steam at sufficiently high pressure that, even though its temperature may be substantially above that of the brine, the steam will condense whereas the brine will evaporate. Make-up brine is provided, for example from sea water, and heat exchange between this make-up brine and the distilled condensate and the brine passing to waste contributes to the maintenance of heat in the system and minimizes the requirements for additional energy. Such additional heat requirements are provided not only by the compressor 32 but by the immersion heaters 54 which are particularly required to provide heat during a starting period.

The description of operation to the extent so far given is common to the present apparatus and to the types of apparatus heretofore provided. In the present apparatus, differences exist which primarily involve downflow of the brine through the tubes 10, this downflow being provided by withdrawal of brine from chamber 16 and recirculation thereof to chamber 14 to flood the upper ends of the tubes 10. The recirculation thus provided by the pump 22 should be at a sufficient rate to provide a very substantial volume of flow through the tubes 10 to the extent that these tubes are practically filled with brine. For clarity of illustration, the tubes 10 have their diameters substantially exaggerated in the drawing and the orifices 12 are shown more restricted than they would actually be. In fact, the orifices 12 may, under some conditions, be eliminated as will be more fully discussed hereafter.

With recirculation taking place as above described, the pressure conditions are as follows:

Obviously, the pressure in the vapor space of chamber 16 is essentially the same as in the vapor space of chamber 14 due to the practically unrestricted flow of steam permitted by the large tube 18. Considering this pressure in the vapor spaces as the datum of reference, it will be evident that from the top of the liquid in the chamber 14 to the upper ends of the tubes 10 there will be an increase of pressure corresponding to the head of the liquid above the upper ends of the tubes. Through the orifices 12 a substantial pressure drop occurs and then a gradual increase of pressure exists from the tops to the bottoms of the tubes 10 with the pressure at the bottoms of the tubes equal to the vapor pressure in the chamber 16. As just indicated, the pressure rise from below the orifices 12 to the bottoms of tubes 10 is relatively small, a major pressure drop occurring through the orifices. The result is that throughout the active heat transferring lengths of the tubes there is only a relatively slight pressure gradient and the pressure is less than but almost the pressure of the vapor spaces.

As a result of the last, active ebullition takes place throughout the lengths of the tubes. Due to the flooding and the large volume of flow of brine downwardly through the tubes, the bubbles of steam are carried downwardly and the steam separates from the brine in the chamber 16 which provides the primary separating space. No steam passes upwardly to escape through the upper ends of the tubes 10. An explanation of this may be offered. The column of liquid below the orifices is falling under the action of gravity and is limited in its velocity only by the restriction of its volume due to the orifices. Since it is approximating free fall, there is little relative gravitational effect to produce buoyancy of steam bubbles which fall with the liquid. Since the liquid as it falls entrains more and more steam, the average density of the combined fluid (brine and steam) is substantially less than that of the brine and therefore the increase of pressure from top to bottom of the tubes is less than would correspond to the head of a similar column of the brine alone. However, due to some hindrance to free fall, there is an appreciable increasing pressure gradient from top to bottom of the tubes and at the upper ends the pressure may approach the vapor pressure of the recirculated brine so that evaporation may commence even before it is heated to a temperature corresponding to boiling at the pressure of the vapor space in the apparatus. Thus evaporation may begin immediately below the orifice, and heat transfer will take place at a boiling coefficient rate rather than at a lower liquid coefficient rate.

A secondary separation of the steam from brine mist takes place in chamber 14 after the steam passes upwardly through tube 18. As noted above, more elaborate separation than indicated in the drawing may be provided so that steam without droplets of brine will enter the outlet 30 and pass to compressor 32. So called "cyclone" separators may be present both in, or associated with, tube 18 and with the outlet 30.

The high rate of liquid flow downwardly through brine tubes 10, and even more particularly the active ebullition which is occurring throughout the lengths of these tubes, result in a very high rate of heat transfer.

This is in contrast with the upward flow of brine through tubes in prior evaporators in which, as indicated above, only the upper portions of the tubes involved ebullition and, consequently, only these upper portions involve the high rate of heat transfer associated therewith. Furthermore, in such prior evaporators, the liquid flow rate was substantially less than in the present one.

Reference was made above to the use or non-use of orifices 12. Whether or not such orifices should be provided depends upon the requirements on the operation. As indicated above, if a restricted orifice is provided, the pressure drop from that existing immediately above the orifice to the value of the pressure in the vapor chamber 16 is largely made up of the drop through the orifice so that a relatively small increasing pressure gradient exists from the point in a tube below the orifice to the lower end of the tube. However, even if there is no orifice, there will be a substantial pressure drop at the entrance to the tube where the velocity of the liquid changes so that even then the pressure gradient through the tube will be small and may be in part negative and in part positive. An orifice, of course, limits the amount of liquid flowing and, since it is desirable to have a high rate of recirculatory flow, it may in the interest of such rate, when desired, be advisable to omit a special orifice, particularly if the tubes are of small diameter. Instead of tubes with or without orifices, there may be used what could be considered intermediate these alternatives: tapered tubes having their minimum internal cross-sectional areas at their upper ends and increasing in internal cross-sectional areas downwardly.

The large central tube 18 provides for overflow in the event that the pumping rate exceeds the full flow capacities of the brine tubes 10. This overflow limits the head of liquid above the tube sheet 6, this head being desirably low in order to prevent the existence of too high a head pressure above the tube sheet.

As in prior installations, the external energy input to the system is relatively low and is provided primarily by the compressor 32, aided by the electrical immersion heaters when required. In the present apparatus, there is also some input of energy by the pump 22 which becomes heat in the apparatus and, consequently, is used. As a result, there is no substantial energy burden put on the apparatus by reason of the recirculating pump and, in fact, this burden is completely absorbed in the better heat exchange which occurs due to the maintenance of ebullition throughout the brine tubes.

Foaming is minimized since free separation of the vapor from the liquid is effected during the drop of the liquid from the lower ends of tubes 10 to the liquid surface in chamber 16, and the shower of liquid suppresses any maintenance of foam in chamber 16. There is, of course, no tendency towards foam formation in chamber 14.

Forced circulation has the advantage, known per se, of insuring no local hot spots in which the liquid is evaporated to dryness with formation of scale.

While the invention has been shown with vertical brine tubes in which boiling occurs, it will be evident that similar considerations would apply to an arrangement in accordance with the invention in which the liquid to be evaporated would fall through passages between either horizontal or vertical tubes containing compressed vapor, which passages may, if desired, be of downwardly increasing cross-sectional area; in brief, all that is required for application of the invention is provision for fall of the liquid to be evaporated under a flooded condition in which a "barometric" column exists giving rise to an increasing pressure gradient in a downward direction, irrespective of the shape of the horizontal cross-section of the falling liquid.

It may further be noted that it is not necessary that the chamber above the tubes or other vertical conduits should have a vapor space, but it may in fact be filled with liquid, the vapor being taken solely from a chamber into which the liquid drops.

What is claimed is:

1. Distilling apparatus comprising a condensing chamber, upright tubes passing through said chamber, vapor chambers above and below said condensing chamber joined by said tubes, means limiting the liquid level in the lower vapor chamber to provide a vapor space above the liquid level therein, pumping means for circulating liquid to be evaporated from the lower vapor chamber to the upper vapor chamber and to maintain a level of liquid in the upper vapor chamber substantially above the upper ends of said tubes, the openings in the upper ends of said tubes being completely submerged so that said tubes are flooded with liquid and a column of liquid falls downwardly through each of said tubes and through the vapor space above the liquid level in the lower vapor chamber, a conduit extending from above the liquid level in the upper vapor chamber downwardly to at least the level of the lower ends of said tubes and terminating above the liquid level in the lower vapor chamber providing free communication between the vapor spaces above the liquid levels in said vapor chambers, and means providing an outlet for vapor from one of said vapor chambers.

2. Distilling apparatus comprising a condensing chamber, upright tubes passing through said chamber, said tubes being provided with orifice members at their upper ends, vapor chambers above and below said condensing chamber joined by said tubes, means limiting the liquid level in the lower vapor chamber to provide a vapor space above the liquid level therein, pumping means for circulating liquid to be evaporated from the lower vapor chamber to the upper vapor chamber and to maintain a level of liquid in the upper vapor chamber substantially above the upper ends of said tubes, the openings in the upper ends of said tubes being completely submerged so that said tubes are substantially flooded with liquid and a column of liquid falls downwardly through each of said tubes and through the vapor space above the liquid level in the lower vapor chamber, a conduit extending from above the liquid level in the upper vapor chamber downwardly to at least the level of the lower ends of said tubes and terminating above the liquid level in the lower vapor chamber providing free communication between the vapor spaces above the liquid levels in said vapor chambers, and means providing an outlet for vapor from one of said vapor chambers.

3. Distilling apparatus comprising a condensing chamber, upright tubes passing through said chamber, vapor chambers above and below said condensing chamber joined by said tubes, means limiting the liquid level in the lower vapor chamber to provide a vapor space above the liquid level therein, pumping means for circulating liquid to be evaporated from the lower vapor chamber to the upper vapor chamber and to maintain a level of liquid in the upper vapor chamber substantially above the upper ends of said tubes, the openings in the upper ends of said tubes being completely submerged so that said tubes are flooded with liquid and a column of liquid falls downwardly through each of said tubes and through the vapor space above the liquid level in the lower vapor chamber, a conduit extending from above the liquid level in the upper vapor chamber downwardly to at least the level of the lower ends of said tubes and terminating above the liquid level in the lower vapor chamber providing free communication between the vapor spaces above the liquid levels in said vapor chambers, means providing an outlet for vapor from one of said vapor chambers, and means for compressing vapor flowing from said vapor chamber and for delivering it to said condensing chamber.

4. Distilling apparatus comprising a condensing chamber, upright tubes passing through said chamber, a vapor chamber below said condensing chamber and in communication with the lower ends of said tubes, means limiting the liquid level in said vapor chamber to provide a vapor space above the liquid level therein, pumping means for circulating liquid to be evaporated from said vapor chamber to the upper ends of said tubes, the openings in the upper ends of said tubes being completely submerged so that a solid column of liquid is caused to flow downwardly into said tubes, and means extending from the region between the lower ends of said tubes and the liquid level in said vapor chamber providing an outlet from said vapor chamber.

5. Distilling apparatus comprising a condensing chamber, upright tubes passing through said chamber, a vapor chamber below said condensing chamber and in communication with the lower ends of said tubes, means limiting the liquid level in said vapor chamber to provide a vapor space above the liquid level therein, pumping means for circulating liquid to be evaporated from said vapor chamber to the upper ends of said tubes, the openings in the upper ends of said tubes being completely submerged so that a solid column of liquid is caused to flow downwardly into said tubes, means extending from the region between the lower ends of said tubes and the liquid level in said vapor chamber providing an outlet from said vapor chamber, and means for compressing vapor flowing from said vapor chamber and for delivering it to said condensing chamber.

6. Distilling apparatus comprising means providing at least one conduit for downward flow of liquid to be evaporated, said conduit being in part at least bounded by walls exposed to vapor to be condensed, a vapor chamber below and in communication with said conduit to receive liquid therefrom, means limiting the liquid level in said vapor chamber to provide a vapor space above the liquid level therein, pumping means for circulating liquid to be evaporated from said vapor chamber to the upper end of said conduit, the opening of the upper end of said conduit being completely submerged and said pumping means pumping liquid at a rate sufficient to flood the inlet to said conduit and substantially fill said inlet with the liquid, and means extending from the region between the lower end of said conduit and the liquid level in said vapor chamber providing an outlet from said vapor chamber.

7. Distilling apparatus comprising means providing at least one conduit for downward flow of liquid to be evaporated, said conduit being in part at least bounded by walls exposed to vapor to be condensed, a vapor chamber below and in communication with said conduit to receive liquid therefrom, means limiting the liquid level in said vapor chamber to provide a vapor space above the liquid level therein, pumping means for circulating liquid to be evaporated from said vapor chamber to the upper end of said conduit, the opening of the upper end of said conduit being completely submerged and said pumping means pumping liquid at a rate sufficient to flood the inlet to said conduit and substantially fill said inlet with the liquid, means extending from the region between the lower end of said conduit and the liquid level in said vapor chamber providing an outlet from said vapor chamber, and means for compressing vapor flowing from said vapor chamber and for delivering it to said walls for condensation by heat exchange with said liquid.

8. Distilling apparatus comprising a condensing chamber, upright tubes passing through said chamber, a vapor chamber below said condensing chamber and in communication with the lower ends of said tubes, means limiting the liquid level in said vapor chamber to provide a vapor space above the liquid level therein, pumping means for circulating liquid to be evaporated from said vapor chamber to the upper ends of said tubes, the openings in the upper ends of said tubes being completely submerged so that a solid column of liquid is caused to flow downwardly into said tubes, and means extending from the region between the lower ends of said tubes and the liquid level in said vapor chamber providing an outlet from said vapor chamber, said vapor outlet being an upright passage and providing a 180° turn of the vapor passing out of the lower ends of said upright tubes and into the lower end of the vapor outlet passage.

9. Distilling apparatus comprising a condensing chamber, upright tubes passing through said chamber, a vapor chamber below said condensing chamber and in communication with the lower ends of said tubes, means limiting the liquid level in said vapor chamber to provide a vapor space above the liquid level therein, pumping means for circulating liquid to be evaporated from said vapor chamber to the upper ends of said tubes, the openings in the upper ends of said tubes being completely submerged so that a solid column of liquid is caused to flow downwardly into said tubes, and means extending from the region between the lower ends of said tubes and the liquid level in said vapor chamber providing an outlet from said vapor chamber, said vapor outlet being an upright passage disposed substantially centrally of said upright tubes and providing a 180° turn of the vapor passing out of the lower ends of said upright tubes and into the lower end of the vapor outlet passage.

References Cited in the file of this patent

UNITED STATES PATENTS

| Number | Name | Date |
|---|---|---|
| 549,001 | Mellen | Oct. 29, 1895 |
| 692,788 | Jewell | Feb. 4, 1902 |
| 1,150,713 | Soderlund | Aug. 17, 1915 |
| 1,200,996 | Soderlund et al. | Oct. 10, 1916 |
| 2,185,595 | Kleinschmidt | Jan. 2, 1940 |
| 2,266,941 | Vande Griendt | Dec. 23, 1941 |
| 2,447,746 | Ferris et al. | Aug. 24, 1948 |
| 2,449,587 | Chambers | Sept. 21, 1948 |

OTHER REFERENCES

"Compression Distillation", by Allen Latham, Jr., from vol. 24, Number 12, Dec. 1945, Petroleum Refiner, pages 127–130.